United States Patent [19]

Bellanger

[11] Patent Number: 4,722,426
[45] Date of Patent: Feb. 2, 1988

[54] CLUTCH PROTECTION SYSTEM

[75] Inventor: Regis Bellanger, Mississauga, Canada

[73] Assignee: Massey-Ferguson Services N.V., Curacao, Netherlands Antilles

[21] Appl. No.: 861,625

[22] PCT Filed: Sep. 6, 1985

[86] PCT No.: PCT/EP85/00453
§ 371 Date: May 7, 1986
§ 102(e) Date: May 7, 1986

[87] PCT Pub. No.: WO86/01864
PCT Pub. Date: Mar. 27, 1986

[30] Foreign Application Priority Data

Sep. 15, 1984 [GB] United Kingdom ............... 8423394

[51] Int. Cl.⁴ .............................................. F16D 25/14
[52] U.S. Cl. ............................. 192/0.033; 192/30 W; 192/85 R; 192/103 F
[58] Field of Search ............... 192/0.032, 0.033, 0.076, 192/30 W, 85 R, 103 F; 361/238, 242

[56] References Cited

U.S. PATENT DOCUMENTS

| | | | |
|---|---|---|---|
| 4,116,321 | 9/1978 | Miller | 192/103 F |
| 4,348,585 | 9/1982 | Hoffman | 235/92 CT |
| 4,425,992 | 1/1984 | Makita | 192/0.076 X |
| 4,428,467 | 1/1984 | Hiramatsu | 192/0.076 X |
| 4,457,411 | 7/1984 | Hiramatsu | 192/0.076 |
| 4,488,140 | 12/1984 | Lang et al. | 192/30 W X |
| 4,502,579 | 3/1985 | Makita | 192/0.076 X |

FOREIGN PATENT DOCUMENTS

| | | |
|---|---|---|
| 2500095 | 8/1982 | France . |
| 2523675 | 9/1983 | France . |
| 2093618 | 9/1982 | United Kingdom . |
| 2163230 | 2/1986 | United Kingdom ............ 192/103 F |

OTHER PUBLICATIONS

Regulungstechnische Praxis, vol. 16, No. 11, Nov. 1974, Muenchen, (DE) "Elektronische Überwachung von Machinenkupplungen", p. 300.

Primary Examiner—Rodney H. Bonck
Assistant Examiner—Richard M. Lorence

[57] ABSTRACT

A clutch protection system to guard against overheating due to excessive slippage in a friction clutch (12). The system which is particularly suitable for use with a tractor power take-off clutch includes sensors (18, 19) to provide signals indicative of the input and output speeds of the clutch and an indicating device (56) which receives a first signal (I) indicative of the clutch input speed and a second signal (X) indicative of either the clutch output speed when the clutch engagement pressure is applied or the clutch input speed when the clutch engagement pressure is not applied. The indicating device has a signal level indicative of the difference between the first and second signals minus a signal indicative of the cooling effect on the clutch due to its own rotation. A comparator (56) compares the signal level of the indicating device with a predetermined signal level indicative of, for example, a potentially damaging clutch operating condition and actuates a warning device (40) and disengages the clutch when the predetermined clutch operating condition occurs.

9 Claims, 2 Drawing Figures

4,722,426

CLUTCH PROTECTION SYSTEM

TECHNICAL FIELD

This invention relates to friction clutches and in particular to protection systems which guard against overheating of such clutches due to excessive slippage.

There are many applications where the protection of clutches against damage due to excessive slippage are desirable. One such application is a clutch in a tractor power take-off (PTO) drive line used to connect and disconnect a power take-off (PTO) shaft from the tractor engine.

It is an object of the present invention to provide a clutch protection system to guard against overheating due to excessive slippage which is suitable for the protection of a PTO drive line clutch.

DISCLOSURE OF THE INVENTION

According to the present invention there is provided a clutch protection system to guard against overheating due to excessive slippage in a friction clutch having an engagement means which applies an engagement pressure to the clutch, the system including sensing means to provide signals indicative of the input and output speeds of the clutch; an indicating device which receives a first signal indicative of the clutch input speed and a second signal indicative of either the clutch output speed when the clutch engagement pressure is applied or the clutch input speed when the clutch engagement pressure is not applied, the indicating device having a signal level indicative of the difference between the first and second signals minus a signal indicative of the cooling effect on the clutch due to its own rotation; comparison means for comparing the signal level of the indicating device with a predetermined signal level indicative of a clutch operating condition; and response means responsive to a predetermined comparison result to action a warning device or disingage the clutch.

The operation of the indicating device can be expressed mathematically by stating, for example, that the signal level of the indicating device is proportional to $I - S.X$ (where $I$ is the input speed signal, $S$ is scaling factor which takes account of the cooling effect on the clutch due to its own rotation, and $X$ is the output speed signal when the clutch engagement pressure is applied and the input speed signal when the clutch engagement pressure is not applied) and this signal level is compared in the comparison means with the predetermined signal level.

For example, the comparison means may compare the signal level of the indicating device with first and second predetermined signal levels indicative of different levels of clutch slippage and the response means will action a warning if the signal level of the indicating device exceeds the first predetermined signal level (indicating, for example, that a higher than desirable but still tolerable slippage level exists) and will action a further warning and disengage the clutch if the signal level of the indicating device exceeds the second predetermined signal level (indicating, for example, that slippage has risen to a level above which it cannot be allowed to rise without a serious risk of permanent damage to the clutch).

Determination of the appropriate predetermined signal levels for a given clutch design and/or installation is easily achieved by a system designer who will know (or can determine by testing) the maximum level of slip which the clutch can be subjected to without incurring permanent damage (referred to above as the second predetermined level). The designer can then set his own early warning of potentially dangerous slip levels (the first predetermined level referred to above). This early warning level of slippage could be say half the maximum level of slippage or some other proportion depending both on the inclination of the designer to play safe and also on the clutch design and its installation. For example, as discussed below, the Applicant has found that with a particular tractor PTO drive line clutch installation the second predetermined level could be appropriately set at the signal level reached by the indicating device in two seconds with the clutch fully engaged and with the clutch input running at 2200 revs/min. and the clutch output held stationary. The appropriate corresponding first predetermined level was found to be half the second predetermined level.

As explained previously once the predetermined signal level or levels have been set by the system designer the scaling factor S required to simulate the cooling effect of the clutch for a given clutch and/or installation can also be determined. This is achieved, for example, by the designer deciding what he considers to be an acceptable operating temperature for the clutch and then determining how long it will take the clutch temperature to fall to this chosen temperature from the temperature achieved at the second predetermined signal level with the clutch rotating at a given speed, say its rated speed, and with no slippage in the clutch. This ability of the clutch to cool at given rate due to its own rotation is then simulated by scaling factor S in terms of a rate of reduction in the signal level of the indicating device which will reduce the signal level of the indicating device from its second predetermined signal level to zero in the time taken for the clutch to reach the chosen acceptable operating temperature from the temperature achieved at the second predetermined signal level. For example, in the tractor PTO drive line clutch installation referred to above the scaling factor, as explained below, was chosen so as to reduce the indicating device signal level to zero in three minutes with the clutch input running at 1800 revs/min and no clutch slippage.

The clutch protection system of the present invention is particularly suitable for use in conjunction with a clutch engagement control system as described and claimed in the Applicants co-pending published UK patent application No. 2156938A in which clutch engagement is effected by fluid pressure supplied from a pressure source via a solenoid operated valve controlled in accordance with target clutch output acceleration criteria using the so-called pulse width modulation technique. By oscillating the control valve between its "off" and "on" conditions at a high frequency the rate of build-up of clutch-engaging pressure can be controlled so that the acceleration of the clutch output member follows the desired pattern as described and claimed in the above referred to co-pending application.

When the clutch protection system of the present invention is used in conjunction with a clutch engagement control system in accordance with co-pending published UK patent application No. 2156938A X is taken as the output speed signal during the "on" condition of the solenoid operated valve and the input speed signal during the "off" condition of the valve.

Conveniently the indicating device may comprise a digital counter which receives a first series of count pulses indicative of clutch input speed and a second series of count pulses which is either indicative of clutch output or input speed depending on whether the clutch engagement pressure is applied or not, the arrangement being such that the count level in the counter represents the difference between the first and second series of count pulses minus a scaled proportion of said second series of count pulses to simulate the cooling effect

DESCRIPTION OF THE DRAWINGS

One embodiment of the present invention as applied to a tractor PTO drive line clutch will now be described, by way of example only, with reference to the accompanying drawings in which.

BEST MODE OF CARRYING OUT THE INVENTION

Figure 1:
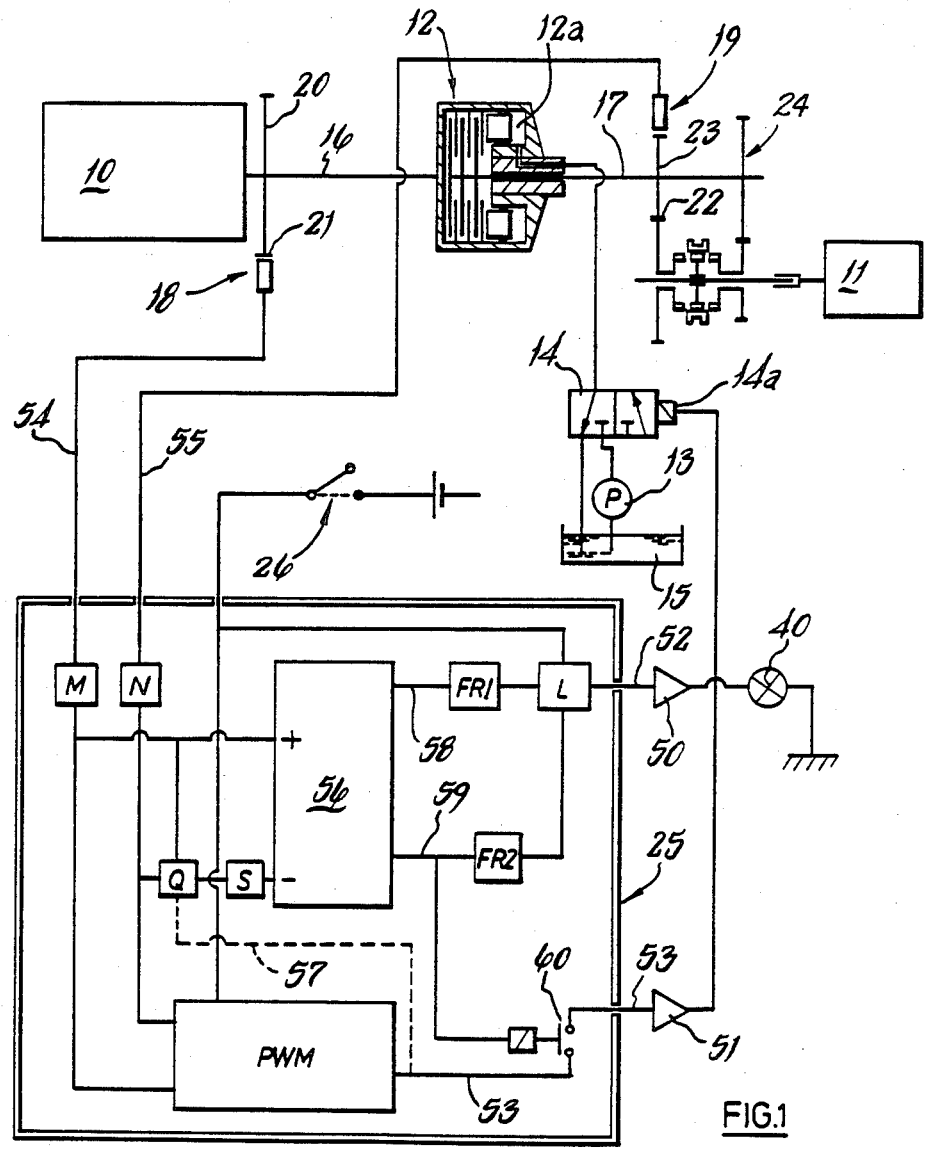
FIG. 1 is a diagrammatic representation of a clutch protection system in accordance with the present invention.

Referring to FIG. 1 this shows a diagrammatic representation of a PTO drive line for a tractor in which an engine 10 drives an implement 11 via a PTO clutch 12 and a two-speed gear set 24. Clutch 12 is engaged by fluid pressure supplied by a pump 13 via a solenoid-operated valve 14 and is disengaged by spring means (not shown) when the clutch is vented to a sump 15 by valve 14.

The precise constructional details of clutch 12 form no part of the present invention and will not therefore be described in detail. Any known form of PTO clutch of the necessary torque capacity could be used. For example, the multiplate type of PTO clutch currently used on the Massey-Ferguson 2000 Series tractors in which pressurisation of an annular chamber 12a engages the clutch.

The solenoid valve 14 is also of known form and has two positions. When in the "off" position shown in which its solenoid 14a is not energised the clutch is disengaged since chamber 12a is vented to sump 15. When in the "on" position the solenoid 14a is energised and the valve is displaced to its other position in which the clutch is connected with the pump 13 to pressurise chamber 12a and engage the clutch.

Two sensing devices 18 and 19 are provided to sense the speed of rotation of the shaft 16 which acts as the input into clutch 12 and shaft 17 which acts as the output of the clutch. These sensing devices may be of any suitable form and again the precise constructional details of these devices do not form part of the present invention. For example, the sensing devices may be of the known electromagnetic type in which a specially provided tooth disc rotates with each shaft and the passage of the teeth of this disc past a coil induces a pulsating voltage in the coil circuit whose frequency of pulsation is a measure of the speed of rotation of the associated shaft.

Ideally, the provision of special toothed discs to provide the clutch input and output speed indications is to be avoided and as shown, for example, the starter motor teeth 21 on the outer periphery of the engine flywheel 20 can be utilised as part of the sensing device 18 and the teeth 22 on a gear wheel 23 which forms part of two speed gear set 24 can be utilised as part of sensing device 19.

The pulse counts coming from sensing devices 18 and 19 are fed as inputs into a micro-processor control circuit indicated diagrammatically by box 25 in FIG. 1.

Although control circuit 25 operates digitally, in order to facilitate the understanding of the operation of the circuit, its main processing operations are diagrammatically illustrated within box 25 in FIG. 1 using a block diagram electrical circuit anology.

Control circuit 25 receives an input signal from a driver-operated on-off switch indicated diagrammatically at 26 which the driver closes when he wishes to engage the PTO clutch 12. A warning light 40 is illuminated in either a continuous display or flashing mode by the control circuit 25 via a driving unit 50 and an output line 52 and the solenoid 14a of valve 14 communicates with circuit 25 via driving unit 51 and output line 53.

The control circuit 25 includes a clutch engagement control system in accordance with the Applicant's previously referred to UK patent application No. 2156938A in which during the clutch engagement process the solenoid 14a of control valve 14 is oscillated at a high frequency using the so-called pulse width modulation technique in order that the rate of build-up of clutch engaging pressure is controlled by valve 14 so that the acceleration of the clutch output shaft 17 flows a predetermined pattern to ensure a progressive and shock-free engagement of the clutch 12.

As described and claimed in the above referred to patent application, the pulse width modulation function (designated PWM in FIG. 1) receives the pulse counts coming from sensors 18 and 19 via lines 54 and 55 and scaling devices M and N which take account of any difference in the number of teeth on flywheel 20 and on gear wheel 23. The PWM function sets target accelerations for the clutch output shaft 17 dependent on the ratio of the clutch input and output speeds in accordance with a predetermined acceleration to speed-ratio relationship. The PWM function compares the target acceleration levels of the clutch output shaft with the actual acceleration levels achieved by the output shaft and adjusts the rate of increase of the clutch engagement pressure by oscillating the solenoid 14a of control value 14 via line 53 so that the target levels are achieved. If further details of the operation of the PWM function are desired, the reader is referred to UK patent application No. 2156938A.

Control circuit 25 also includes a clutch protection system in accordance with the present invention having an indicating device in the form of counter 56 which indicates the heating effect experienced by clutch 12 due to slippage. The counter 56 has a positive input which receives the scaled signals from line 54 and a negative input which receives either the scaled input from line 55 or line 54 depending on whether solenoid 14a is energised or not. This switching of the negative counter input between lines 54 and 55 is indicated diagrammatically in FIG. 1 by a switching means Q which is actuated dependent on the operation of solenoid 14a as indicated by dotted line 57. The negative counter input whether from line 54 or 55 is also scaled in an appropriate scaling device by a scaling factor S (referred to previously and also discussed below) which takes account of the cooling effect on the clutch due to its own rotation.

It will be appreciated from the above that the signal level in counter 56 is equal to $I - S.X$ where $I$ is the clutch input speed signal count from line 54, $S$ is the scaling factor discussed above, and $X$ is either the output speed signal count from line 55 or the input speed signal count from line 54 depending on whether solenoid 14a is actuated or not. A mathematical justification for the use of a counter signal level of this form to represent a practical approximation to the heating effect experienced by the clutch 12 due to slippage is given later below.

Counter 56 also performs a comparison function by comparing its current signal level with first and second predetermined count levels indicative of different levels of clutch slippage. The first signal level corresponds to a level of slippage which is higher than desirable but still tolerable whilst the second signal level corresponds to a level of slippage above which slippage cannot be allowed to rise without a serious risk of permanent damage to the clutch. Counter 56 produces an output signal (represented at line 58 in FIG. 1) when the counter signal level is above the first level and below the second level and a further output signal (represented by line 59 in FIG. 1) when the counter signal level reaches the second level.

As previously stated the Applicants have found in a particular tractor PTO driveline which they have tested that a second signal level equivalent to the signal generated in the counter in two seconds with the clutch fully engaged and with the clutch input running at 2200 revs/min and the clutch output held stationary was appropriate. It was also found appropriate to make the first signal level equal to half the second level.

When an output appears at line 58 the light 40 which was previously continuously lit following the closing of switch 26, is flashed at a low frequency using a frequency controller FR1 to warn the tractor operator that clutch slippage levels are rising to higher than desirable levels. If an output appears at line 59 solenoid 14a of valve 14 is deactivated by a switch 60 to disengage the clutch 12 and prevent permanent damage to the clutch and a second frequency controller FR2 flashes light 40 at a higher frequency to warn the operator that the protection system has disengaged the PTO clutch.

For simplicity of illustration light 40 is shown in FIG. 1 as being controlled via a control device L from which emerges either a signal for constant illumination of the light when switch 26 is closed or a signal from frequency controller FR1 or FR2 to flash the light when the counter signal level reaches the first and second signal levels as described above.

The counter 56 operates on an 80 ms (milliseconds) cycle time the same as the PWM function. Thus the counter signal level is updated every 80 ms so that the current counter signal level at any moment is equal to the value of I−S.X for the previous 80 ms time period. The counter signal level is then compared with the first and second predetermined signal levels at regular intervals, for example, every 0.5 seconds.

As will be appreciated when the clutch 12 has been disengaged by switch 60 re-engagement of the clutch will commence under the control of the PWM function once switch 60 has closed again. Switch 60 will close as soon as the current counter signal has fallen below the second predetermined signal level. Similarly flashing of light 40 will stop as soon as the current counter level falls below the first predetermined signal level.

Figure 2:
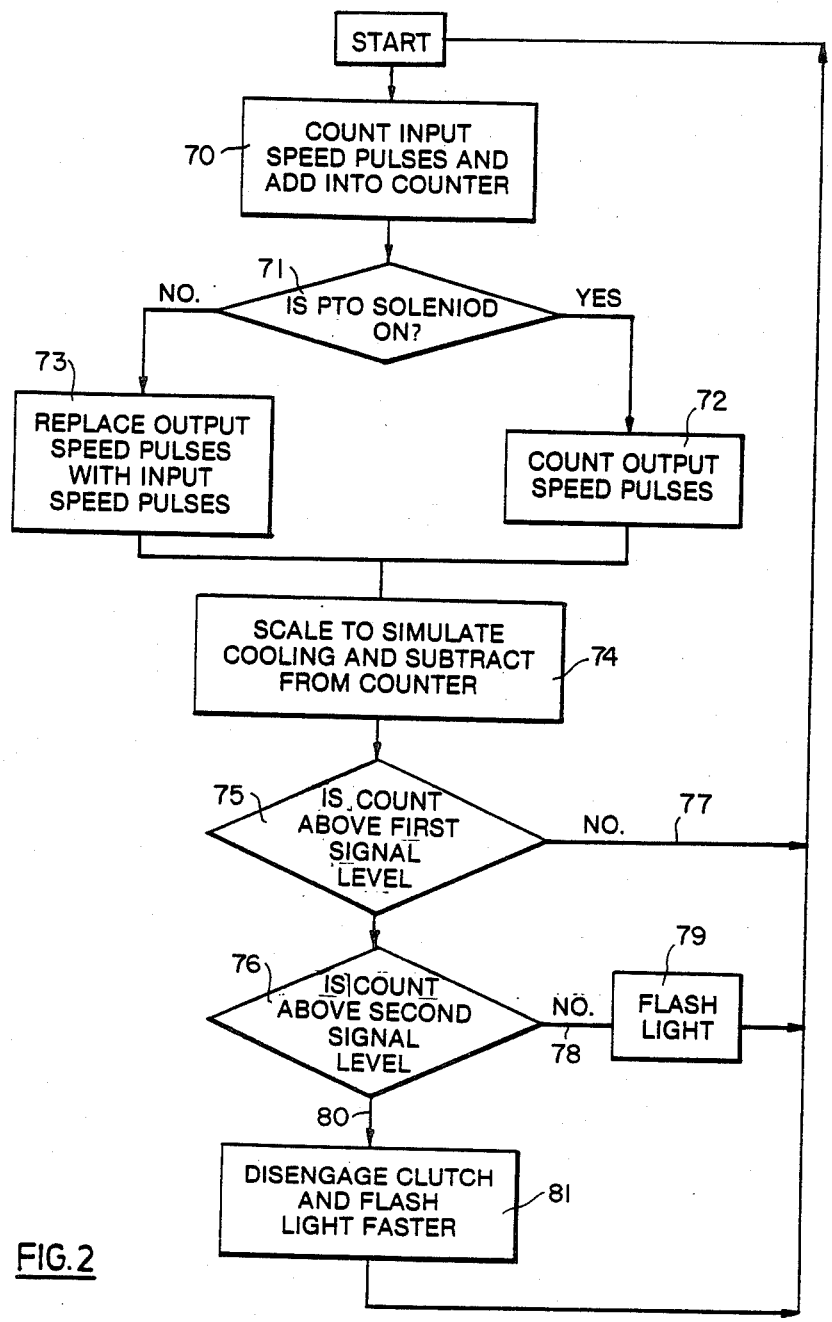
FIG. 2 is a logic diagram for a clutch protection system in accordance with the present invention

The above described operation of the protection system is diagrammatically illustrated in FIG. 2 which is a basic logic diagram for the operation of the system.

As indicated in box 70 the input speed pulses from sensor 18 are added into counter 56. Dependent on whether the clutch 12 is engaged, which is determined by decision box 71 which ascertains whether solenoid 14a is energised or not, either the output pulses from sensor 19 (see box 72) or the input pulses from sensor 18 (see box 73) are multiplied by the scaling factor S and subtracted from the count level in counter 56 (see box 74). The level in counter 56 is compared with the first and second predetermined signal levels (see decision boxes 75 and 76 respectively). If the current count level is below the first predetermined level, as indicated by logic line 77, no action is taken and the entire logic operation is then repeated. If the current count level is above the first predetermined level but below the second level, as indicated by logic line 78, the warning light 40 is flashed, as indicated by output box 79. If the current count level is above the second predetermined level, as indicated by logic line 80 the clutch 12 disengaged and light 40 is flashed at a higher frequency, as indicated by output box 81.

A mathematical analysis of the factors affecting the heating effect experienced by clutch 12 during use of the PTO drive line reveals the following:

The power dissipated (PD) in the clutch=Torque (wI−wO)

Where wI and wO are the input and output angular velocities of the clutch.

The cooling rate of the clutch due to its own rotation is a function of at least wI, wO and the temperature of the clutch.

If we assume as an approximation that the input angular velocity and temperature are substantially constant then the cooling rate is approximately equal to $K \cdot wO$ where K is a constant.

Thus the heating effect over the time period t can be written as:

$$\text{Heating Effect} = \int_0^t \text{Torque}\,(wI - wO)\,dt - \int_0^t K \cdot wO\,dt$$

If we assume a substantially constant torque K' then:

$$\text{Heating Effect} = \int_0^t K'(wI - wO)\,dt - \int_0^t K \cdot wO\,dt$$

$$= \int_0^t K'[WI - (1 + K/K')\,WO]\,dt$$

It will be observed that $$\int_0^t wI\,dt \text{ and } \int_0^t wO\,dt$$

are in effect the clutch input an output shaft speed counts which we will designated as I and X respectively.

Therefore the heating effect is proportional to

I−(I+K/K') X.

That is heating effect is proportional to I−S.X where S is the scaling factor (1+K/K').

Thus the signal level I−S.X generated in counter 56 provides a signal which is sufficiently accurately proportional to the heating effect generated in the PTO clutch 12 to enable a practical clutch protection system to be designed around this signal.

As explained previously once the predetermined signal level or levels have been set by the system designer the scaling factor S required to simulate the cooling effect of the clutch for a given clutch and/or installation can also be determined. This is achieved, for example, by the designer deciding what he considers to be an acceptable operating temperature for the clutch and then determining how long it will take the clutch temperature to fall to this chosen temperature from the temperature achieved at the second predetermined signal level with the clutch rotating at a given speed, say its rated speed, and with no slippage in the clutch. This ability of the clutch to cool at given rate due to its own rotation is then simulated by scaling factor S in terms of a rate of reduction in the signal level of the indicating device which will reduce the signal level of the indicating device from its second predetermined signal level to zero in the time taken for the clutch to reach the chosen acceptable operating temperature from the temperature achieved at the second predetermined signal level. For example, in the tractor PTO drive line clutch installation referred to above the scaling factor was chosen so as to reduce the indicating device signal level to zero in three minutes with the clutch input running at 1800 revs/min and no clutch slippage.

If in a given drive line installation 60 pulses/rev emerge from sensing device 18 and 30 pulses/rev emerge from sensing device 19 scaling device M will need to scale its count rate by a factor of 2 to take account of the situation.

Given that the second signal level is equal to the signal generated in the counter in two seconds when the clutch input is running at 2200 rev/min and the clutch output is stationary this will give a reading of $$\frac{2200 \times 2 \times 30}{60}$$

pulses for the second signal level.

If, for example, the counter 56 is an eight bit binary register it will have a maximum count level of 256. Thus the pulse count rate coming from sensing devices 18 and 19 needs to be scaled accordingly. In the particular example chosen scaling devices M and N can therefore also be arranged to scale the pulse rates from sensing devices 18 and 19 by a factor of say 16 ($2^4$) which is easy to achieve and which will give a second signal level of 138 (that is $$\frac{2200 \times 2 \times 30}{60 \times 16}$$

in the counter.

Given that the scaling factor S is chosen in the example quoted above, so as to reduce the counter level from its second signal level of say 138 as discussed above to zero in 3 mins. with the clutch input running at 1800 revs/min it will be observed this 3 min period will result in $3 \times 1800 \times 30$ pulses from the input sensing means 18.

Thus the number of pulses per count is $$\frac{3 \times 1800 \times 30}{138}$$

Thus if 1 count is subtracted from the counter reading every 1174 pulses from the sensing means 18 the required scaling factor S is achieved.

Although the invention has been described above in terms of a digital counter 56 forming part of a microprocessor control circuit 25 it will be appreciated that the invention can be realised using an analogue approach in which, for example, the signals from sensing devices 18 and 19 are continuously read as voltages and the resultant voltage in accordance with the algebraic relationship $I - S.X$ gives a continuous indication of the heating effect being experienced by the clutch 12.

In an alternative configuration the early warning of tolerable but higher than desirable levels of slippage (provided by the first predetermined signal level) is not employed and the system is simply arranged to disengage the clutch when the previously described second predetermined signal level is reached. When the system is configured in this manner the warning light 40 is continuously lit when the operator closes switch 26 and commences to flash when the clutch is disengaged by the system to warn the operator that the system has disengaged the clutch.

The present invention thus provides a simple but effective protection system for a clutch to guard against overheating due to excessive slippage which is particularly suitable for the protection of a PTO drive-line clutch.

I claim:

1. A clutch protection system to guard against overheating due to excessive slippage in a friction clutch (12) having an engagement means which applies an engagement pressure to the clutch, the system being characterised by the inclusion of sensing means (18,19) to provide signals indicative of the input and output speeds of the clutch; an indicating device (56) which receives a first signal (I) indicative of the clutch input speed and a second signal (X) indicative of either the clutch output speed when the clutch engagement pressure is applied or the clutch input speed when the clutch engagement pressure is not applied, the indicating device having a signal level indicative of the difference between the first and second signals minus a signal indicative of the cooling effect on the clutch due to its own rotation; comparison means (56) for comparing the signal level of the indicating device with a predetermined signal level indicative of a clutch operating condition; and response means responsive to a predetermined comparison result to actuate a warning device (40).

2. A clutch protection system according to claim 1 for use with a friction clutch (12) in which the engagement means comprises a fluid pressure operated clutch actuator (12a) fed with pressurised fluid via a solenoid operated valve (14) which is oscillated at high frequency between "off" and "on" conditions during clutch engagement to control the rate of build up of pressure in the actuator using a pulse width modulation technique, the system being characterised in that the second signal (X) received by the indicating device (56) is taken as the clutch output speed signal during the "on" condition of the solenoid operated valve and as the clutch input speed signal during the "off" condition of said valve.

3. A clutch protection system according to claim 1 characterised in that the comparison means (56) compares the signal level of the indicating device (56) with first and second predetermined signal levels indicative of different levels of clutch slippage and the response means actions a warning (40) if the signal level of the indicating device exceeds the first predetermined signal level and actions a further warning and disengages (60) the clutch (12) if the signal level of the indicating device (56) exceeds the second predetermined signal level.

4. A clutch protection system according to claim 1 characterised in that the indicating device signal level used to action disengagement of the clutch is set at the signal level reached by the indicating device (56) in two seconds with the clutch (12) fully engaged and with the clutch input (16) running at 2200 revs/min and the clutch output (17) held stationary.

5. A clutch protection system according to claim 1 characterised in that the signal (S) indicative of the cooling effect of the clutch (12) due to its own rotation is set at a level such that it will reduce the counter signal level from the clutch disengagement level to zero in three minutes with a clutch input speed of 1800 rev/min and no clutch slippage.

6. A tractor power take-off drive including a friction clutch (12) having a protection system according to claim 1.

7. A clutch protection system according to claim 1 characterised in that the response means disengages the clutch in response to a predetermined comparison result.

8. A clutch protection system according to claim 1 characterised in that the indicating device comprises a digital counter (56) which receives a first series of count pulses (I) indicative of clutch input speed and a second series of count pulses (X) which is indicative of either the clutch output speed when the clutch engagement pressure is applied or the clutch input speed when the clutch engagement pressure is not applied, the arrangement being such that the count level in the counter represents the first series of count pulses minus the product of the second series of count pulses and a scaling factor (S) which simulates said cooling effect.

9. A clutch protection system to guard against overheating due to excessive slippage in a friction clutch (12) having an engagement means which applies an engagement pressure to the clutch, the system being characterised by the inclusion of sensing means (18,19) to provide signals indicative of the input and output speeds of the clutch; an indicating device (56) which receives a first signal (I) indicative of the clutch input speed and a second signal (X) indicative of either the clutch output speed when the clutch engagement pressure is applied or the clutch input speed when the clutch engagement pressure is not applied, the indicating device having a signal level which represents the first signal minus the product of the second signal and a scaling factor (S) which simulates the cooling effect on the clutch due to its own rotation; comparison means (56) for comparing the signal level of the indicating device with a predetermined signal level indicative of a clutch operating condition; and response means responsive to a predetermined comparison result to actuate a warning device (40).

* * * * *